Figure 2:
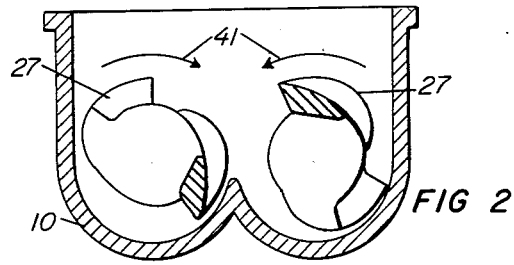

June 13, 1961   W. GRUBENMANN ET AL   2,987,760
DOUBLE TROUGH KNEADING MACHINE
Filed May 12, 1959

INVENTORS
Werner Grubenmann and
Rudolph Schlaefli

BY Wenderoth, Lind & Ponack
ATTORNEYS

United States Patent Office 2,987,760
Patented June 13, 1961

2,987,760
DOUBLE TROUGH KNEADING MACHINE
Werner Grubenmann, Neuewelt, near Basel, and Rudolf Schlaefli, Riehen, Switzerland, assignors to Ciba Limited, Basel, Switzerland
Filed May 12, 1959, Ser. No. 812,705
Claims priority, application Switzerland May 12, 1958
7 Claims. (Cl. 18—2)

The present invention relates to a double trough kneading machine.

The mixing and kneading machines herein referred to as double trough kneading machines are used in the chemical industry for a wide variety of purposes for dry, semiplastic and plastic materials. In double trough kneading machines, two kneading shafts, arranged side by side, rotate in two troughs arranged side by side and which form the floor of the machine. The kneading shafts either take the form of shafts passing right through the machine with kneaders attached to them, or they take the so-called S-form in which a straight shaft does not pass right through the machine but consists of two kneading blades (or kneaders), displaced with respect to each other by about 180°, and joined by a central connector. In both those types, the actual kneaders are, in general, of trapezoidal cross-section with straight or convex flanks which are symmetrical with respect to a radius passing through the axis of rotation. The actual kneaders are of helical shape, in general with a twist of the working edge of 90° or more, the two kneaders mounted on one shaft having helices of opposite hands.

A disadvantage attendant upon the use of kneaders having the conventional section for working very tough substances which will not draw out is the fact that part of the said substances adheres permanently to certain parts of the kneader and no longer takes part in the kneading process, alternatively, it is found that a portion of the content of the trough is lifted up and remains above the level of the two kneader arms. That portion does not return to the trough for some time and therefore does not take part in the actual effective kneading or mixing process during this time.

It is an object of the present invention to overcome this drawback of the double trough kneading machines hitherto known.

The invention provides a double trough kneading machine comprising a kneading trough, two kneader shafts rotating in opposite sense, each shaft having at least two helical kneader blades, each kneader blade having, at each point along its length, a cross-section, taken transversely of the axis of rotation of the blade, which is asymmetric and in which the leading kneader face of each blade does not project beyond a surface joining the axis of rotation and the kneader edge of the blade taken in the direction of rotation and in which the trailing kneader face is convex.

Figure 1:
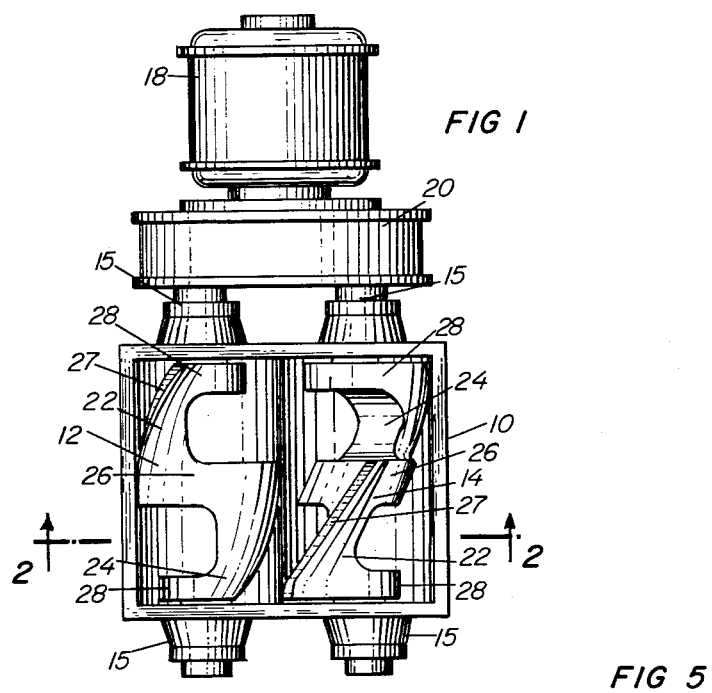
Figure 3:
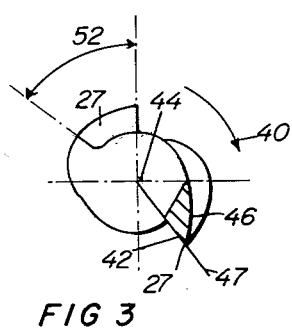
Figure 4:
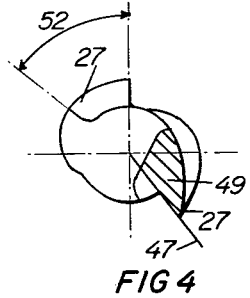
Figure 5:
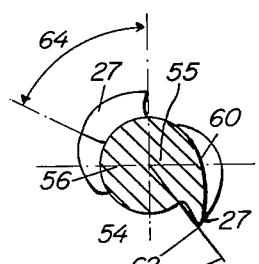

Embodiments of the invention will now be described in greater detail with reference to the accompanying drawings of which:

FIG. 1 is a plan view of a kneading machine,
FIG. 2 is a section on the line 2—2 of FIG. 1,
FIGS. 3 and 4 are cross-sections of S-shaped kneaders mounted on shafts, and,
FIG. 5 is a cross-section through a kneader mounted on a through shaft.

FIG. 1 shows a plan view of a double trough kneading machine. The mixing trough 10 holds the two kneader shafts 12 and 14 which are supported at each end in bearings 15 located outside the trough. The two shafts are driven at different speeds by a motor 18 through gearing in a gear box 20. In the embodiment shown in FIGS. 1 and 2, kneading shafts of the so-called S-shape are used.

Each shaft consists of two helically twisted kneader blades 22 and 24 joined to each other by a central connector 26 and which, at each end, are integral with the ends 28. The axial length of the kneader blades 22 and 24 may or may not be the same. In the embodiment of FIGS. 1 and 2 they are not of the same length. The right-hand and left-hand shafts—which per se are identical—are so arranged that the shorter kneader blade 22 of the lefthand shaft is opposite the longer kneader blade 24 of the right-hand shaft, and vice versa. This arrangement as such is known.

FIG. 2 shows a section on the line 2—2 through the apparatus shown in FIG. 1. The section reveals that the bottom of the machine 10 has a central inward projection thereby providing the two troughs. Depending on the purpose to which the machine is to be put, the troughs may also be provided with a heater or a cooling system. The troughs can also be provided with a tight cover so that kneading can take place in a vacuum or with volatile solvents.

Each kneader blade has a helical kneader or working edge 27, a leading kneader face or flank 42, and a rear or trailing face or flank 46. FIGURES 2, 3, 4 and 5 show the transverse cross section of the shaft to be asymmetric with respect to a radius 47 through the kneader edge 27. The leading kneader face of each blade i.e. the forward surface of the blade as taken in the sense of rotation does not project beyond a surface joining the axis of rotation and the kneader edge of the blade. The axis of rotation of the kneader is indicated at 44 (FIGURES 3, 4 and 5). The leading face 42 in these sections disposed at right angles to the axis of rotation thus always lies entirely behind the radius 47 taken in the direction of rotation of the shaft as indicated by the arrow in FIG. 3. In the cases shown in FIGS. 3 and 4 the leading face coincides with the radius 47, whereas in the case of FIG. 5 it is behind this radius. The rear or trailing edge is convex in all cases.

The radius of curvature of the convex rear face 46 may vary in a continuous manner being a maximum at the working edge 27 and decreasing towards the axis of rotation 44.

In an alternative embodiment of the invention the cross-section of the kneader blade can also be of varying shape along the axis, more particularly that of the rear, convex flank. As there is a greater tendency for material being kneaded to adhere to the rear flank on the outside, i.e. near the edge of the trough, than near the axis of rotation, it has been found to be of advantage so to shape the rear flank of the cross-section of the kneader blade that its curvature is greater, i.e. more convex, on the outside than towards the centre.

FIG. 4 shows another cross-section through an S-shaft, but one in which the supporting cross-sectional area 49 of the kneader part is much greater than in the case of FIG. 3. Otherwise this embodiment is the same as FIG. 3.

As will be seen from FIGS. 1 and 2 the kneader blades are of helical shape, the sense of twist of these helices with respect to the direction of rotation indicated by the arrows 41 (FIG. 2) being such that on being set in rotation the kneaders transport substance to be kneaded from the edges of the trough both axially and inwardly so that the substance is constantly being impelled towards the centre of the trough. The angle 52 of twist of the kneader blades constructed in accordance with the invention is with advantage smaller than 90°, preferably near 60°. This is in contrast to known designs in which this angle is 90° or more.

The embodiments shown in FIGS. 3 and 4 show kneader shafts of S-shape. It will be understood that the kneader shape described above can also be used in the case of kneaders with straight shafts passing through the machine. This is indicated in FIG. 5 which shows a cross-section through the kneader of the machine having such shafts and is more suitable for heavy work. A comparison of the cross-sections of FIGS. 3, 4 and 5 will show that if the cross-section of the supporting material of an S-shaped kneader is increased, this shape gradually assumes that of the shaft. The detailed design for any particular application depends on the properties of the substance which is to be kneaded.

The disposition of the front flank or face 54 of the embodiment of FIG. 5 is such that it lies behind the radius 47. That plane is indicated in FIG. 5 by the line 55 and FIG. 5 shows that this line is behind the rotation axis 56 of the embodiment of FIG. 5, i.e. the leading kneader face of each blade does not project beyond a surface joining the axis of rotation and the kneader edge of the blade taken in the direction of rotation thereof.

It will be understood that the front flank need not be straight as shown in FIG. 5; it can with advantage also be scooped, i.e. concave. The rear flank or face 60 is again convex and its radius of curvature becomes smaller from the working edge 62 towards the centre. The angle of twist 64 is, as before, less than 90°.

Tests have shown that the drawbacks of kneaders of conventional shape are overcome by kneaders constructed in accordance with the invention. The substance being kneaded is not lifted, nor are "dead" zones formed at the front or rear faces of the kneaders in which the substance is retained and ceases to take part in the kneading process. This is achieved by the particular inclination and shape of the front and rear flanks of the kneader. The reduction of the angle of twist to a value of less than 90° results also in an efficient mixing process in an axial direction.

What we claim is:

1. A kneading machine having a kneading trough, two kneader shafts arranged side by side in said trough and rotating in opposite directions with the top portions of the shafts moving toward each other, each shaft having at least two kneader blades thereon, said blades having helical kneading edges, said blades having asymmetric cross sections at right angles to the axis of rotation of the shaft, said blades having forward surfaces facing in the direction of rotation of the shaft which at the most have the outer ends projecting only to limiting surface defined between the axis of rotation and the kneading edge, and said blades having convex trailing edges.

2. A kneading machine having a kneading trough, two kneader shafts arranged side by side in said trough and rotating in opposite directions with the top portions of the shafts moving toward each other, each shaft having at least two kneader blades thereon, said blades having helical kneading edges, said blades having asymmetric cross sections at right angles to the axis of rotation of the shaft, said blades having forward surfaces facing in the direction of rotation of the shaft which have portions thereof inside of the outer end thereof which recede backwards from a limiting surface defined between the axis of rotation and the kneading edge, and said blades having convex trailing edges.

3. A double trough kneading machine as claimed in claim 1, in which the radius of curvature of the trailing flank of the kneaders varies from point to point, reducing from the kneader edge towards the axis of rotation.

4. A double trough kneading machine as claimed in claim 1, characterized by the fact that the contour of the trailing flank of a kneader blade varies along a shaft carrying the blade.

5. A double trough kneading machine as claimed in claim 1, characterized by the fact that the curvature of the trailing flank is greater on the outside than in the centre.

6. A double trough kneading machine as claimed in claim 1, characterized by the fact that the angle of twist of the kneaders is less than 90°.

7. A double trough kneading machine as claimed in claim 1, characterized by the fact that the angle of twist is about 60°.

References Cited in the file of this patent

UNITED STATES PATENTS

| | | |
|---|---|---|
| 1,516,488 | Banbury | Nov. 25, 1904 |
| 1,364,401 | Mosher | Jan. 4, 1921 |
| 1,370,398 | Banbury | Mar. 1, 1921 |
| 2,027,185 | Loomis | Jan. 7, 1936 |
| 2,209,559 | Brennan et al. | July 30, 1940 |